United States Patent [19]

Kishi et al.

[11] Patent Number: 4,504,722
[45] Date of Patent: Mar. 12, 1985

[54] FULLY AUTOMATED MACHINING APPARATUS OPTIMIZATION FOR ELECTRIC DISCHARGE MACHINING APPARATUS

[75] Inventors: Masakazu Kishi, Kawasaki; Yasuo Suzuki, Yokosuka, both of Japan

[73] Assignee: Hitachi Seiko Ltd., Tokyo, Japan

[21] Appl. No.: 352,765

[22] Filed: Feb. 26, 1982

[51] Int. Cl.³ ............................................... B23P 1/08
[52] U.S. Cl. ................................ 219/69 P; 219/69 C; 219/69 D
[58] Field of Search .................... 219/69 R, 68, 69 C, 219/69 P, 69 S, 69 G, 69 D

[56] References Cited

U.S. PATENT DOCUMENTS

| | | | |
|---|---|---|---|
| 3,767,886 | 10/1973 | Sennowitz | 219/69 S |
| 4,071,729 | 1/1978 | Bell, Jr. | 219/69 G |
| 4,335,436 | 6/1982 | Inoue | 219/69 G |
| 4,361,745 | 11/1982 | Rupert et al. | 219/69 G |
| 4,370,536 | 1/1983 | Kruth | 219/69 G |

FOREIGN PATENT DOCUMENTS

WO81/02127 8/1981 PCT Int'l Appl. ............. 219/69 G

OTHER PUBLICATIONS

"Micro-Computer Controlled Spark-Erosion", pp. 24-28, 9/1980, EDM Digest.

Primary Examiner—M. H. Paschall
Attorney, Agent, or Firm—Antonelli, Terry & Wands

[57] ABSTRACT

An electric discharge machining apparatus capable of automatically optimizing the machining stabilizing condition including set voltage of machining pulse, duty factor of the pulse, electrode raising period and working fluid pressure, and hence capable of being full-automated. Each machining stabilizing condition is successively changed within a predetermined range and set when the maximum effective discharge generation rate is obtained. Spark machining is effected on the basis of the set value.

18 Claims, 22 Drawing Figures

| MATERIAL | | SEQUENCE PATTERN | SEARCH SEQUENCE SEARCH RANGE | UNIT P: Kg/cm² T:sec U: V τ: % | REMARKS (FLUID STREAM) (PROCESS) | |
|---|---|---|---|---|---|---|
| ELECTRODE | WORKPIECE | | | | NOZZLE JET STREAM | SIDE STREAM |
| COPPER | IRON | I | P 0.05~0.3, T₁ 10~95, U₁ 60~30, T₂ ~95, U₂ ~30 → REPEAT | | ○ | × |
| | | II | P 0.05~0.3, T₁ 10~95, U₁ 60~30, T₂ ~95, U₂ ~30 → REPEAT | | × | ○ |
| | SUPER HARD ALLOY | III | T₁ 10~95, U₁ 60~30, T₂ ~95, U₂ ~30 → REPEAT | | × | × |
| IRON | IRON | IV | P₁ 0.05~0.3, T₁ 10~15, U₁ 60~70, P₂ ~1.0, T₂ ~15, U₂ ~2, P₃ U₃ ~15, T 0.1~10 → REPEAT | | ○ | × |
| | | V | P 0.05~0.3, T₁ 10~50, U₁ 60~30, T₂ ~70, U₂ ~30, T 0.1~10 → REPEAT | | × | ○ |

FULLY AUTOMATED MACHINING APPARATUS OPTIMIZATION FOR ELECTRIC DISCHARGE MACHINING APPARATUS

This invention relates to electric discharge machining apparatus and more particularly to an electric discharge machining apparatus wherein the machining pulse condition and the machining stabilizing condition are automatically set so as to ensure fully-automated electric discharge machining.

Conventionally, in order to assure stable electric discharge or spark machining, the effective discharge generation rate is measured and control factors such as set voltage (reference voltage), duty factor of pulse, hunting or reciprocation period and working fluid pressure are controlled so that the measured effective discharge generation rate exceeds a predetermined value. Practically, however, the effective discharge generation rate varies greatly with the configuration of the electrode and material of the workpiece, thus making it impossible to adapt the conventional automatic control of the individual control factors for the effective discharge generation rate that is in excess of the predetermined value. More particularly, to comply with a variety of alternations of the electrode configuration and workpiece material, the conventional control has relied upon experience and skill case by case for setting the predetermined value, resulting in uncertain possibility for the control factors to be set to optimized values and extreme variation of machining efficiency.

In advance of electric discharge or spark machining, the electrode configuration, electrode material, pulse current and pulse width are so chosen as to meet the required condition such as the configuration, material and finishing degree of a workpiece. Typically, in the spark machining, the workpiece is first machined roughly at high machining efficiency to leave behind a machined workpiece with a predetermined removal margin under the pulse condition that consumption of the electrode is low, and it is then subjected to machining of medium finishing and finally machined under the fine finishing condition that magnitude and width of the pulse is decreased, thus completing machining for production of a machined workpiece of a desired configuration. For automatic switching of the set condition, the pulse condition of the rough machining, medium finishing and fine finishing in compliance with a machining depth may be set beforehand into a well known program controller. On the other hand, where exchange of the electrode and change of the machining condition are desired in process of the rough machining, medium finishing or fine finishing, the exchange of the electrode is automatically accomplished in a manner well known in the art by the use of an electrode exchange device interlocked with an NC apparatus. Also, in a machining process wherein an electrode or a workpiece is moved relative to each other to change the depth of workpiece to be machined, a pattern or an amount of a change required is programmed by the use of an NC apparatus or the like. However, in addition to the aforementioned pulse condition, the machining stabilizing condition such as working fluid pressure, machining voltage, duty factor of the pulse and reciprocation of the electrode must be optimized for highly efficient and stable spark machining.

In the past, no apparatus has been available which follows the program controller or the NC apparatus so as to control the machining stabilizing condition automatically. Thus, the machining operator manually sets the machining condition, degrading machining efficiency.

This invention contemplates therefore elimination of the conventional drawbacks and has for its object to provide an electric discharge machining apparatus capable of automatically providing constantly stable and highly efficient machining even upon change of the electrode configuration and workpiece material.

According to the present invention, there is provided an electric discharge machining apparatus in which discharge pulses are generated between an electrode and a workpiece for spark machining of the workpiece, said apparatus comprising power source means for applying a pulse voltage across the electrode and the workpiece; a discharge state discriminating circuit for generating detection outputs representative of discharge states between said electrode and workpiece; a discharge generation rate detecting circuit for detecting an effective discharge generation rate on the basis of a detection output from said discharge state discriminating circuit and representative of an effective discharge state; a search circuit for changing at least one machining stabilizing condition within a predetermined range; a maximum value discriminating and storing circuit for discriminating a maximum value of the effective discharge generation rate throughout said change and storing therein the maximum value; and optimized machining condition storing means for storing therein an optimized machining condition corresponding to the maximum value of the effective discharge generation rate, whereby spark machining is effected on the basis of the optimized machining condition.

These and other objects, features and advantages of the present invention will be more apparent from the following description taken in conjunction with the accompanying drawings in which:

FIG. 18 shows storage contents of a memory shown in FIG. 17; and

Figures 1, 2:
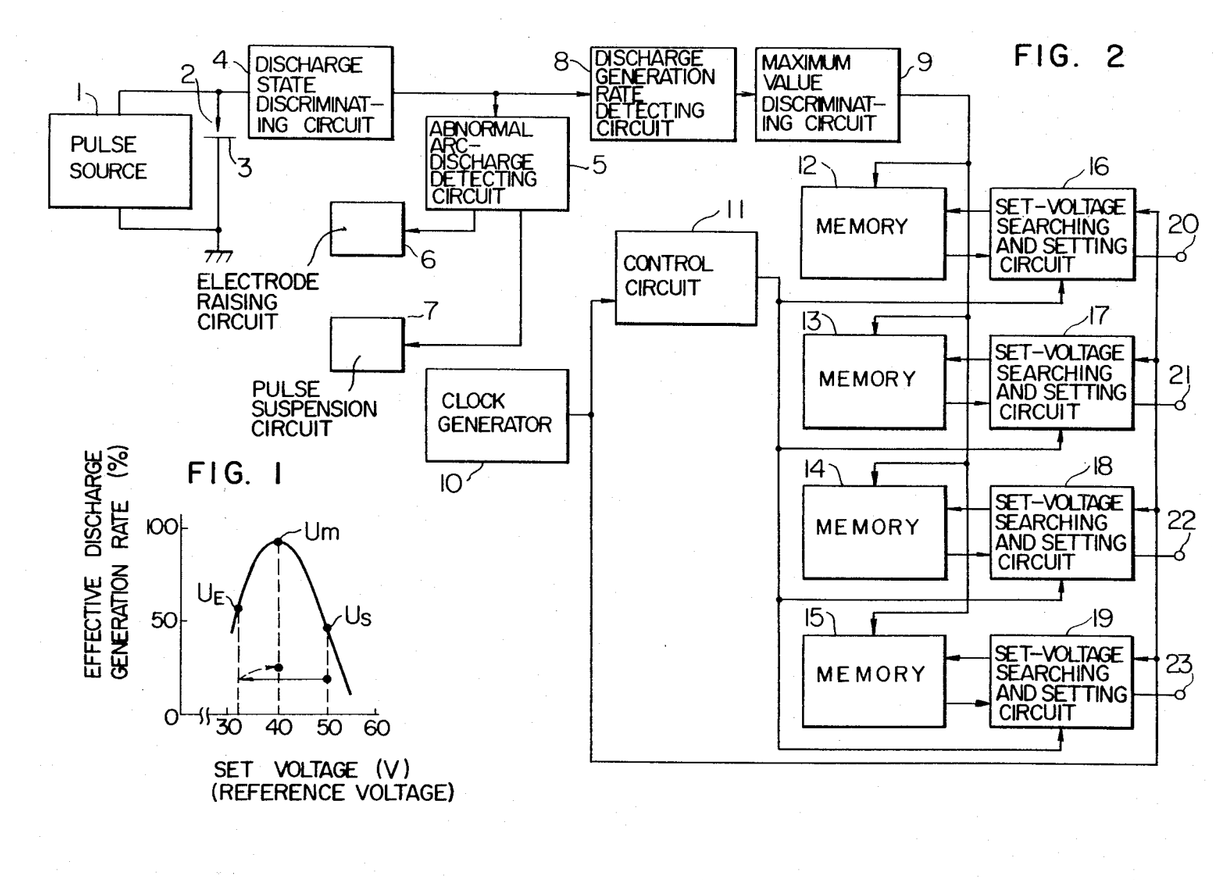
FIG. 1 is a graph, useful in explaining an electric discharge machining apparatus of the invention, showing the relation between set voltage (reference voltage) and effective discharge generation rate.
FIG. 2 is a block diagram showing one embodiment of the electric discharge machining apparatus according to the invention.

The invention will now be described by way of example with reference to the drawings. FIG. 1 shows the relation between one of the control factors, i.e., set voltage (target value of an electrode-gap-follow-servo circuit which corresponds to the gap between the electrode and the workpiece surface) and effective discharge generation rate.

The effective discharge generation rate referred to herein represents, in terms of percentage, a ratio of an integrated conduction time of a discharge current usable for actual spark machining passed under the application of respective pulses of spark machining voltage to its pulse period.

In FIG. 1, an optimized set voltage is determined as follows. An initial value of the set voltage (reference voltage), Us (50 V), is set and gradually decreased, attended with a curve having one apex which represents the effective discharge generation rate. Since in this example the optimum value Um of the set voltage is 40 V for a maximum point of the effective discharge generation rate, the set voltage may be set to this value. Values of the other control factors (not illustrated), namely, duty factor of the pulse, vertical reciprocation period of the electrode and working fluid supplying pressure can be determined in a similar manner.

Figure 4:
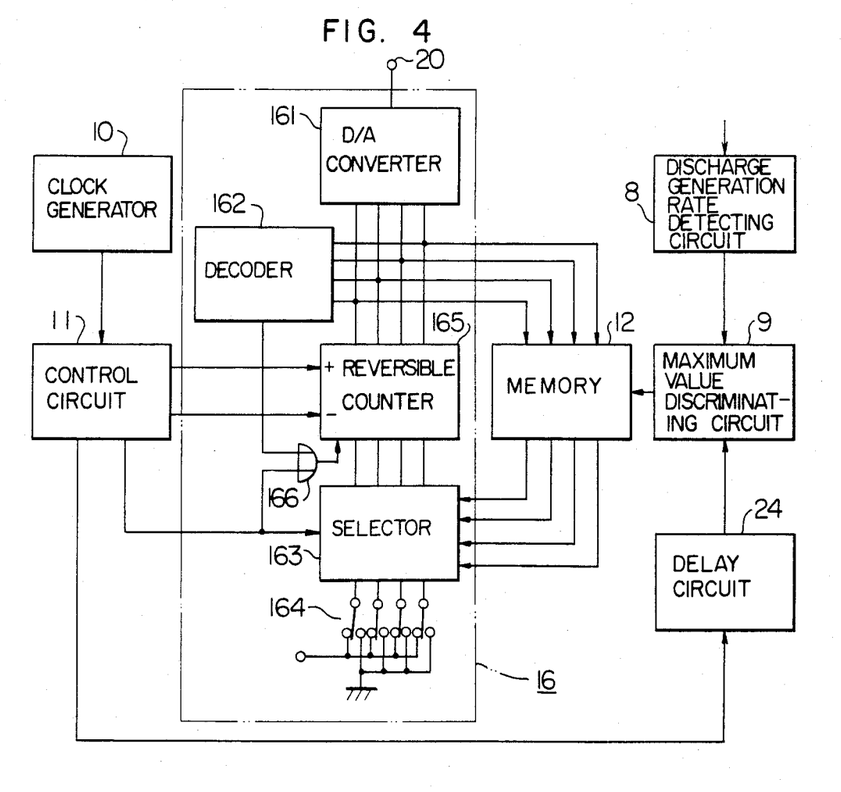
FIG. 4 is a block diagram illustrative of a set voltage searching and setting circuit in FIG. 2.

Referring now to FIG. 2, there is shown an optimization control circuit for automatically optimizing the control factors which comprise a pulse source, an electrode 2, a workpiece 3, a discharge state discriminating circuit 4 for digitally discriminating effective discharge, abnormal arc discharge, short-circuiting and non-discharge states, a continuous abnormal arc discharge detecting circuit 5 for detecting a continuous abnormal arc discharge on the basis of a detection signal derived from the discriminating circuit 4, an electrode raising circuit 6 for raising the electrode on the basis of a continuous abnormal arc discharge detection signal produced from the detecting circuit 5, a pulse suspension circuit 7 for suspending the generation of pulses in response to the abnormal detection signal, an effective discharge generation rate detecting circuit 8, a maximum value discriminating circuit 9 for discriminating the maximum value of the effective discharge generation rate, a search clock generator 10 for generating pulses for searching for the optimum value as explained in FIG. 1, and a control circuit 11 adapted to control sequential switching of the control factors and transfer of values in optimized value memories 12, 13, 14 and 15 into associated search circuits following completion of the search. FIG. 4 shows part of the FIG. 2 circuit, especially, a circuit for setting the optimum value of the set voltage that is one of the control factors.

In optimizing the set voltage, for example, the control circuit 11 supplies, in response to a machining start signal, a search signal to a set voltage searching and setting circuit 16 and the initial value, Us in FIG. 1, is determined in accordance with setting of a switch 164. This initial value is loaded on a reversible counter 165 via a selector 163, and contents of the reversible counter are converted into an analog signal at a digital/analog converter 161 and delivered to an output terminal 20.

This DC output signal serves as a reference voltage Us of electrode-feed-follow-servo which settles spark machining through a given gap. Thereafter, with the application of one pulse from the clock generator 10 to a negative input terminal of the reversible counter 165, the contents of the reversible counter are subtracted by one pulse and consequently, the set voltage being delivered to the analog output terminal 20 is decreased by one step and set to 45 V, for example.

In this manner, the set voltage is decreased stepwise by several volts until the set voltage $U_E$ shown in FIG. 1 is reached. In this process, the effective discharge generation rate normally traces a curve as shown in FIG. 1 including the set voltage Um for the maximum effective discharge generation rate. This set voltage value for the maximum effective discharge generation rate is discriminated at the maximum value discriminating circuit 9 by examining the magnitudes of the effective discharge generation rate in accordance with change of the set voltage by one step. If the latter examined magnitude is larger than the former examined magnitude, a discrimination signal is applied to the optimum value memory 12 for storage of a set voltage value corresponding to the latter examined magnitude into the optimum value memory 12. In this manner, the value of the set voltage Um for the maximum effective discharge generation rate is ultimately stored in the optimum value memory 12.

Upon completion of the search reaching the set voltage $U_E$, a search termination signal is issued from a decoder 162 and the value of the optimum value memory 12 is loaded by the search termination signal on the reversible counter 165 via the selector 163. Subsequently, the optimized set voltage is converted into the analog output and delivered out of the terminal 20 in the form of a reference voltage of the electrode-feed-follow-servo and spark machining is continued through the optimized machining gap.

Subsequent to the optimization of the set voltage, the duty factor, hunting period and working fluid pressure are sequentially optimized in response to the control signals from the control circuit 11 and optimized values of these factors are fed via terminals 21, 22 and 23 to drive circuits for these factors (not shown). With a workpiece of a complicated configuration, even after the search for the control factors thus completed, it is necessary to repeat sequential search for some of the control factors. To this end, a sequence circuit may be incorporated in advance into the control circuit 11 so that, for example, all the control factors are searched in the initial search and thereafter the working fluid pressure and electrode vertical hunting period are again searched separately or alternately at a predetermined interval. Such a modified search is necessary because the machining depth increases as the machining proceeds and the optimized values determined in the initial search become invalid for efficient removal of machining wastes. Further, depending on the configuration to be machined, the search for only one control factor, for example, duty factor is sufficient. In such a case, the other unnecessary control factors may be fixed manually in advance.

In FIG. 4, a delay circuit 24 is adapted to delay the examination of magnitudes of the effective discharge generation rate with respect to the initiation of the one step search.

Figure 3:
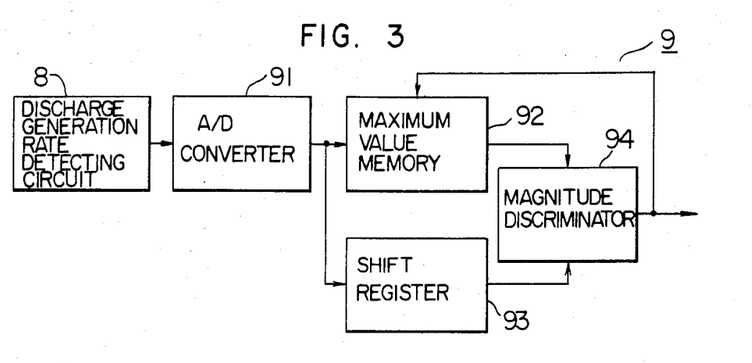
FIG. 3 is a block diagram illustrative of a maximum value discriminating circuit in FIG. 2.

FIG. 3 shows details of the maximum value discriminating circuit 9 comprised of an analog/digital converter 91, a maximum value memory 92, a shift register 93 and a magnitude discriminator 94. When starting machining, an analog signal from the effective discharge generation rate detecting circuit 8 is converted into a digital signal and an initial value is stored in the maximum value memory 92. Then, the set voltage is decreased by one step and a corresponding magnitude of the effective discharge generation rate is fed to the shift register 93 for comparison with the previous contents of the maximum value memory 92. If the contents of shift register 93 is larger, the magnitude discriminator decides that the comparison result is indicative of "large" and the contents of the shift register 93 are transferred to the maximum value memory 92 and concurrently therewith, a discrimination signal indicative of "large" is fed to the optimum value memory 12. Similar operations are repeated so that the maximum value of the effective discharge generation rate and the optimized value are ultimately stored in the maximum value memory 92 and the optimum value memory 12, respectively.

Figure 5:
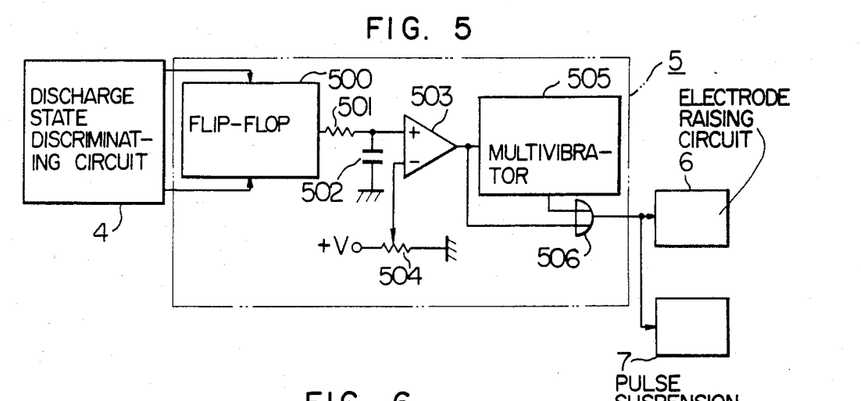
FIG. 5 is a block diagram illustrative of a continuous abnormal arc discharge detecting circuit in FIG. 2.

A continuous abnormal arc discharge accidentally occurring in the course of the relatively slow search must be avoided. FIG. 5 shows details of the continuous abnormal arc discharge detecting circuit 5 which comprises a flip-flop 500 that is set by an abnormal arc discharge signal and/or a short-circuiting signal produced from the discharge state discriminating circuit 4 and reset by an effective discharge signal or a non-discharge signal contained in the signal from the circuit 4, an integration resistor 501, an integration capacitor 502, a comparator 503 having one input connected to the integration capacitor and the other input connected to a level setter 504, a monostable multivibrator 505, and an OR gate circuit 506 connected to receive output signals from the monostable multivibrator and the comparator. A continuous abnormal arc discharge detection signal is delivered out of the OR gate circuit 506.

Figure 6:
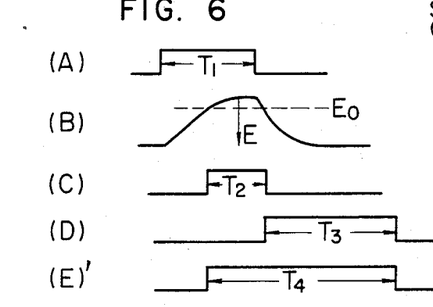
FIG. 6 illustrates in sections (a) through (e) signal waveforms in the circuit of FIG. 5.

In operation, when the abnormal arc discharge signal from the discharge state discriminating circuit 4 continues, the flip-flop 500 produces a signal waveform as shown at section (a) in FIG. 6. A duration $T_1$ reveals that the abnormal arc discharge is continuous. Terminal voltage of the capacitor 502 is integrated by an integration circuit comprised of the resistor 501 and capacitor 502, having a waveform as shown at section (b) which is determined by a time constant of the resistor 501 and capacitor 502. By setting a voltage $E_o$ by the level setter 504, the comparator 503 produces an output of a duration $T_2$ as shown at section (c) when the integration voltage of the continuous abnormal arc discharge exceeds $E_o$. With the production of a waveform of a duration $T_3$ as shown at section (d) by the monostable multivibrator 505, a waveform of a duration $T_4$ as shown at section (e) is produced from the OR gate 506. Generation of abnormal traces due to the continuous abnormal arc discharge cannot be prevented completely by only the waveform of duration $T_2$ but the waveform of duration $T_3$ is considerably effective, as proven by experiments, to prevent the generation of abnormal traces.

Figure 7:
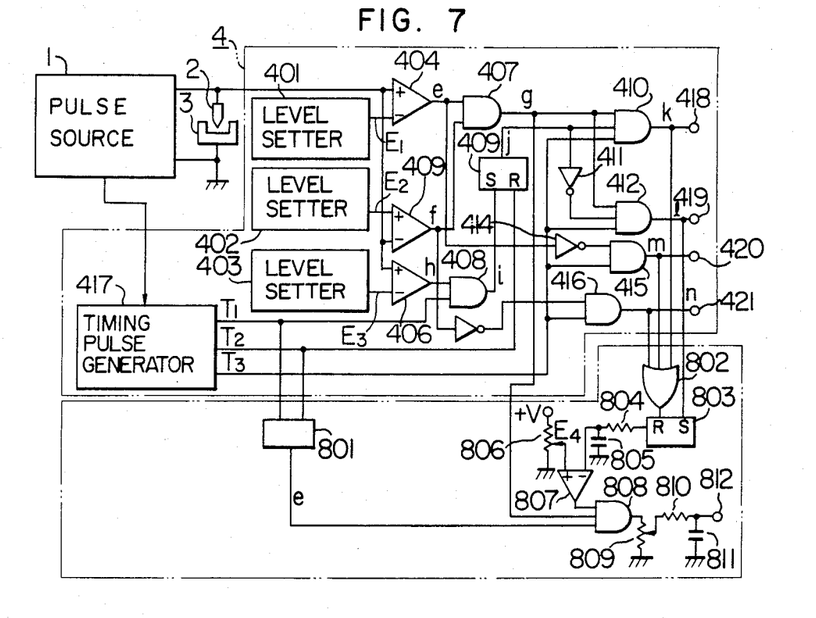
FIG. 7 is a circuit diagram illustrative of a spark machining state discriminating circuit and an effective discharge rate detecting circuit in FIG. 2.
Figure 8:
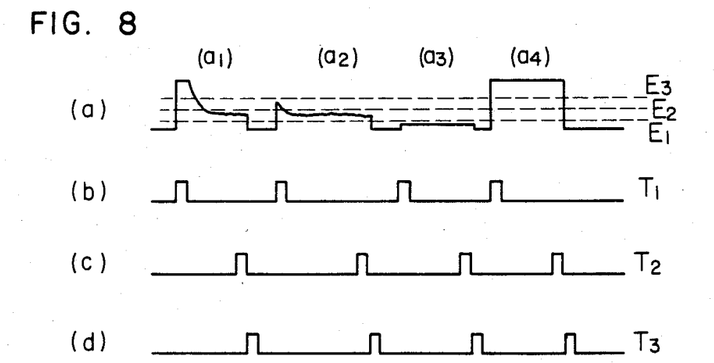
FIG. 8 illustrates in sections (a) through (d) signal waveforms produced from the circuit of FIG. 7.

Referring now to FIGS. 7, 8 and 9A to 9B, the discharge state discriminating circuit 4 and the effective discharge generation rate detecting circuit 8 will be described in more detail. FIG. 8 shows the voltage waveform across the electrode and the workpiece in various discharge states and timing pulses.

The pulse source 1, electrode 2 and workpiece 3 are seen in FIG. 7. The discharge state discriminating circuit 4 surrounded by dotted line comprises a timing pulse generator 417 for generating timing pulses $T_1$, $T_2$ and $T_3$ on the basis of a pulse waveform of the pulse source 1, first, second and third level setters 401, 402 and 403 for applying set voltages $E_1$, $E_2$ and $E_3$ to comparing amplifiers 404, 405 and 406, AND gate circuits 407, 408, 410, 412, 415 and 416, a flip-flop 409, inverters 411, 413 and 414, an effective discharge discriminating signal output terminal 418, an abnormal arc discharge discriminating signal output terminal 419, a short-circuit discriminating signal output terminal 420, and a non-discharge discriminating signal output terminal 421.

The voltage waveform developing across the electrode 2 and the workpiece 3 in various discharge states is classified into four patterns, namely, an effective discharge pattern $a_1$, an abnormal arc discharge pattern $a_2$, a short-circuiting pattern $a_3$ and a non-discharge pattern $a_4$ as shown at section (a) in FIG. 8.

The operation of the discharge state discriminating circuit 4 of FIG. 7 will be described by referring to waveforms in FIGS. 8 and FIGS. 9A to 9D. In FIG. 7, when the set voltages $E_1$, $E_2$ and $E_3$ are settled by the level setters 401, 402 and 403 as shown at section (a) in FIG. 8, various discharge states are detected and discriminated by timing pulses $T_1$, $T_2$ and $T_3$ as shown at sections (b), (c) and (d) in FIG. 8.

FIG. 9 shows the time relationship between waveforms, especially, with waveforms occurring in the effective discharge state illustrated in greater detail. More particularly, when the level $E_1$ is set by the first level setter 401 as shown at (a) in FIG. 8, the first comparison amplifier 404 produces an output waveform e shown in FIG. 9A. With the level $E_2$ set by the second level setter 402, the second comparison amplifier 409 produces an output waveform f. The two waveforms e and f cause the AND gate circuit 407 to produce an output waveform g. Also, with the level $E_3$ set by the third level setter 403, the delivery of an output waveform h from the third comparison amplifier 406 is effected.

Figure 9A:
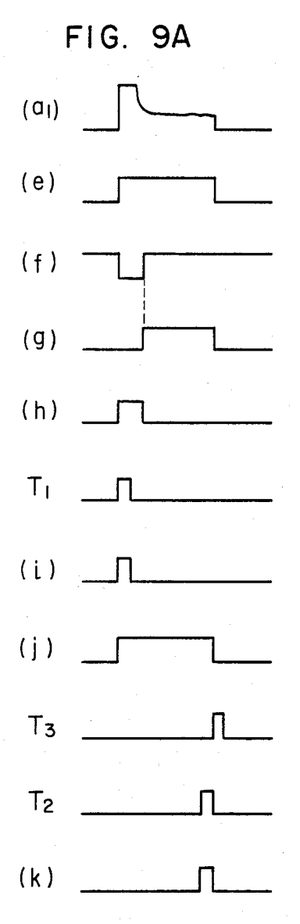
FIGS. 9A to 9D illustrate signal waveforms developing in the circuit of FIG. 7.
Figure 9B:
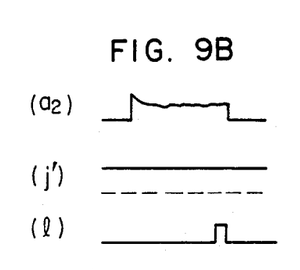
Figure 9C:
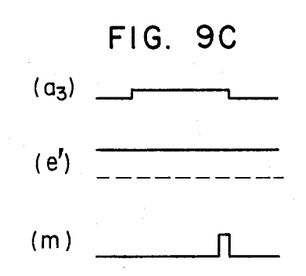
Figure 9D:
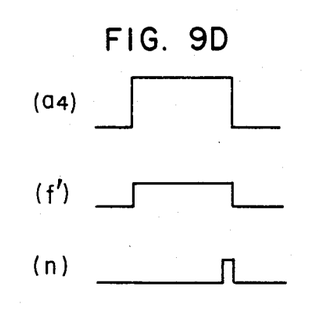

The timing pulse $T_1$ and the output signal h of the third comparison amplifier 406 enable the AND gate circuit 408 and an output waveform i is derived therefrom. The flip-flop 409, which is set by the signal i and reset by the timing pulse $T_3$, produces an output waveform j. And, the AND gate circuit 410 responsive to three inputs, the signal j, timing pulse $T_2$ and signal g, produces an output waveform k. This signal k stands for a discrimination signal which is delivered out of the output terminal 418. Similarly, an abnormal arc discharge discrimination signal l in FIG. 9B, a short-circuiting discrimination signal m in FIG. 9C and a non-discharge discrimination signal n in FIG. 9D are delivered out of the output terminals 419, 420 and 421, respectively. In this manner, various discharge states or patterns can be detected and discriminated.

The effective discharge generation rate detecting circuit 8 shown in FIG. 2 is also detailed in the other dotted line block as shown in FIG. 7. A flip-flop 801 is applied with the timing pulse $T_1$ as a set input and the timing pulse $T_2$ as a reset input from the timing pulse generator 417. The output of the flip-flop 801 is applied to one input of an AND gate 808. A flip-flop 803 is supplied at its set input with the abnormal arc discharge detection signal from the discharge state discriminating circuit 4 and at its reset input with the output of an OR gate circuit 802. The OR gate circuit 02 has three inputs respectively connected to receive the effective discharge, short-circuit and non-discharge detection signals from the discharge state discriminating circuit 4. The output of the flip-flop 803 is coupled to one input of a comparison amplifier 807 via an integration circuit comprised of a resistor 804 and a capacitor 805. The other input of the comparison amplifier 807 is connected to receive a set value $E_4$ from a level setter 806.

The output of the comparison amplifier 807 is coupled to another input of the AND gate circuit 808. The remaining input of the AND gate circuit 808 is connected to receive the output signal of the AND gate 407 included in the discharge state discriminating circuit 4. The output of the AND gate 808 is applied via a variable resistor 809 to an integration circuit comprised of a resistor 810 and a capacitor 811 to produce the effective discharge generation rate detection signal on an output terminal 812.

In operation, the output signal of the AND gate 407 included in the discharge state detecting and discriminating circuit is applied to one input of the AND gate circuit 808. This output signal from the AND gate 407 is seen as the waveform g in FIG. 9A and represents a time over which discharge current is passed. It should be understood thus the output signal of the AND gate circuit 407 representative of the effective discharge time also contains a discharge current conduction time over which the abnormal arc discharge $a_2$ as shown in FIG. 9B occurs. In other words, of the voltage waveform developing across the electrode and the workpiece as shown at (a) in FIG. 8, voltages falling within a range between the levels $E_1$ and $E_2$ are all picked up and delivered out of the AND gate 407.

On the other hand, the flip-flop 803 is set by the abnormal arc discharge detection signal from the discharge state detecting and discriminating circuit 4 and reset by the effective discharge detection signal, short-circuiting signal or non-discharge detecting signal as applied from the discharge state discriminating circuit 4 via the OR gate 802. Consequently, when only the abnormal arc discharge continues, the flip-flop 803 maintains a "1" level output. The output of the flip-flop 803 is integrated at the integration circuit comprised of the resistor 804 and capacitor 805 and applied to one input of the comparison amplifier 807. When this input signal to the comparison amplifier 807 exceeds the set level $E_4$ from the setter 806, the comparison amplifier 807 produces a "0" level output. Thus, when the abnormal arc discharge continues beyond a predetermined time, the "0" level signal is applied to one input of the AND gate 808 to inhibit the transmission of the output signal of the AND gate 407 to the output of the AND gate 808. Conversely, when the continuation time of the abnormal arc discharge is so small that the output signal of the integration circuit comprised of the resistor 804 and capacitor 805 is below the set level $E_4$, the comparison amplifier 807 produces the "1" output which permits the transmission of the output signal of the AND gate 407 to the output of the AND gate 808. Thus, according to this embodiment, the abnormal arc discharge having a small continuation time is taken for the effective discharge and compatibility of the correction signal based on this principle with the machining speed has been affirmed experimentally. The AND gate 808 also receives the output signal of the flip-flop 801 which is determined by the timing pulses $T_1$ and $T_2$ and which corresponds to the waveform 1 in FIG. 9A. Accordingly, this input signal to the AND gate 808 defines the width of a pulse to be applied upon machining and constitutes a synchronizing signal for complete elimination of noises which would take place during time intervals except for the pulse application time in the course of practical machining.

The effective discharge signal thus corrected is divided by the variable resistor and integrated by the integration circuit, and delivered out of the output terminal 812 in the form of an average value. Similarly, the detecting and discriminating circuit can also detect the abnormal discharge time, short-circuiting time and non-discharge time. If the output voltage of the variable resistor 809 is set to the same level (for example 1 (one) volt) for 100% total generation rate of various discharge patterns, the discharge state can conveniently be expressed in terms of percentage. In this case, the sum of generation rates of various discharge patterns in process of machining always amounts to 100%.

With the optimization control circuit as described previously, machining was carried out under the following condition:

(1) A square-bar tapered electrode having a tip area of 1.7 mm square, a top area of 5 mm square and a length of 20 mm;

(2) A workpiece of SKD 11 (-) material to be machined with a depth of 20 mm; and (3)
Pulse width for rough machining: 150 $\mu S$
Pulse width for medium finishing: 50 $\mu S$
Pulse width for fine finishing: 10 $\mu S$ Under this machining condition, while it took 3.5 hours for the skilled operator to complete the machining, the apparatus of the present invention took 2 hours, thereby attaining improvement in machining efficiency without occurrence of any abnormal traces on the machined surface.

As described above, since in the previous embodiment the optimum value of the control factor can be settled by the search circuit and the electrode raising and pulse suspension are cooperative with the operation of the circuit for prevention of occurrence of abnormal traces due to the abnormal arc discharge, it is possible to prevent the abnormal traces from being created due to the abnormal arc discharge through the machining gap during searching for the optimized values of the control factors, so that highly efficient and stable spark machining can always be assured even in the presence of change of the electrode configuration and the workpiece material.

Figure 10:
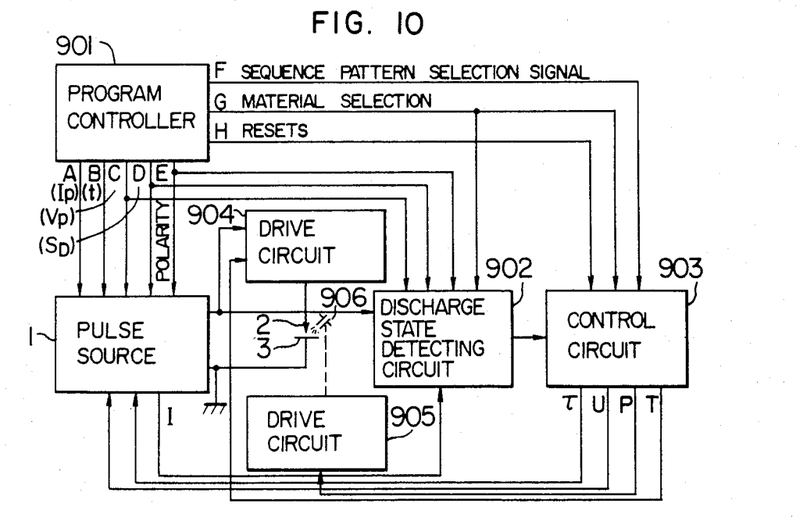
FIG. 10 is a block diagram of another embodiment of the invention.

Reference is now made to FIG. 10 illustrating, in block form, another embodiment of the electric discharge machining apparatus according to the invention which comprises a pulse source 1, an electrode 2, a workpiece 3, a program controller 901, a discharge state detecting circuit 902, a machining stabilizing and control circuit 903, an electrode feed drive circuit 904, a working fluid pressure drive circuit 905, and a working fluid supply nozzle 906. In operation, when starting machining, pulse condition setting signals programmed beforehand in the program controller 901 are applied to the pulse source 1, and a predetermined conditional pulse is applied across the electrode 2 and the workpiece 3 (hereinafter referred to as across the electrodes) from the pulse source. The pulse condition setting signals fed from the program controller 901 to the pulse source 1 are a pulse peak current value signal A, a pulse width signal B, a pulse peak voltage signal C, a command signal D for instructing necessity or unnecessity of the use of a capacitor circuit in the case of supply of a small pulse, and a pulse voltage polarity setting signal E. The discharge state detecting circuit 902 then detects the discharge state on the basis of a voltage waveform across the electrodes and produces a detection signal which is applied to the machining stabilizing and control circuit 903. Detection sensitivity of the discharge state is automatically chosen on the basis of the signals fed from the program controller 901, namely, the pulse peak voltage signal C, the command signal D, the polarity setting signal E and a workpiece material signal G. A timing pulse signal I in synchronism with the period of the pulse produced from the pulse source ensures that the discharge state is detected each time one machining pulse occurs. Subsequently, spark machining is carried out by applying from the machining stabilizing and control circuit 903 a machining voltage U and an optimum value Z of the pulse duty factor $\tau$ to the pulse source 1, an optimum value P of the working fluid pressure to the working fluid pressure drive circuit 905 and an electrode raising period T to the electrode feed drive circuit 904, so that the spark machining state can be optimized on the basis of the signals detected by the discharge state detecting circuit 902. The machining voltage U referred to herein corresponds to the gap across the electrodes and for a low machining voltage, the electrode feed is controlled by the electrode feed drive circuit 904 so that a narrow gap is established. Applied to the machining stabilizing and control circuit 903 are command signals produced from the program controller 901 including a sequence pattern switching signal F, the material selecting signal G and a reset signal H. An operation procedure pattern for obtaining the optimized machining stabilizing condition is selected by the signals F and G. The reset signal H is to start the control operation when starting machining. The reset signal H may be programmed in such a selective manner as to be generated only at the commencement of machining or at the transition from the rough machining to the medium finishing.

Figure 11:
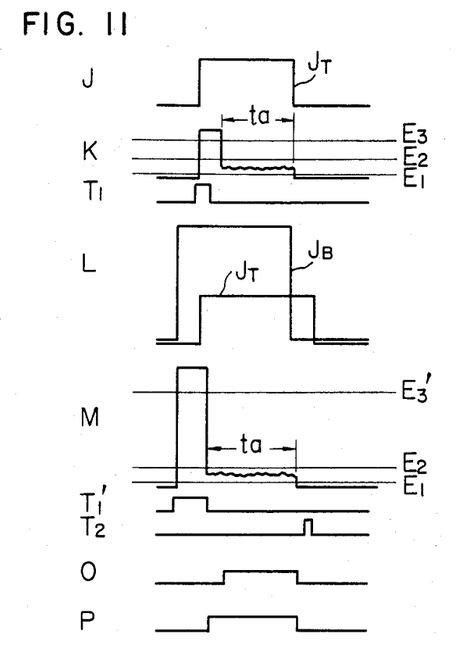
FIG. 11 illustrates signal waveforms developing in the embodiment of FIG. 10.
Figure 12:
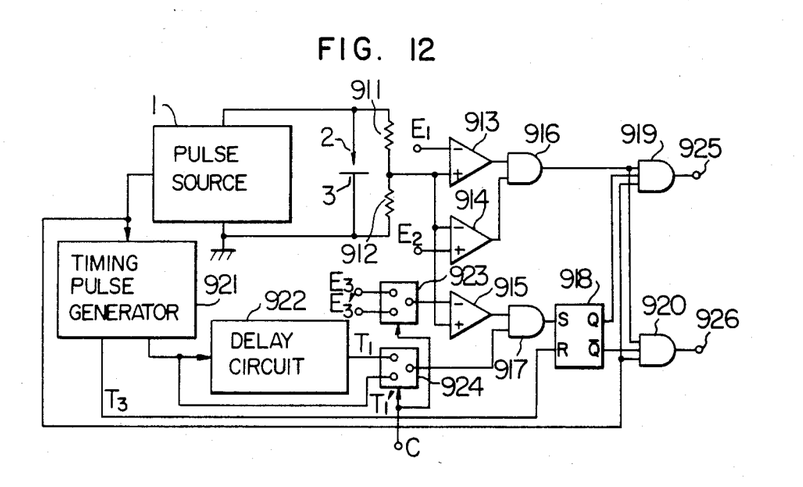
FIG. 12 is a circuit diagram illustrative of part of the FIG. 10 embodiment.
Figure 13:
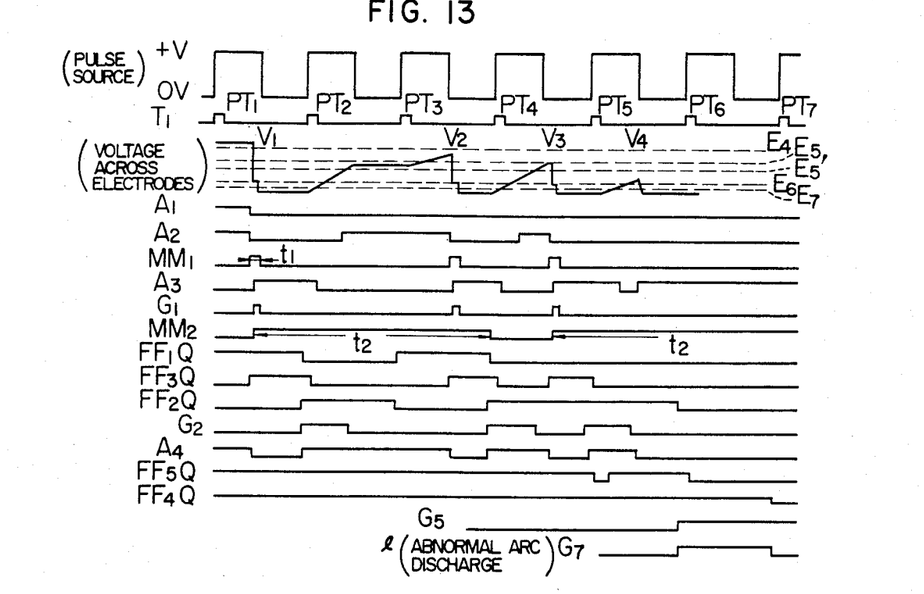
FIG. 13 illustrates signal waveforms useful in explaining the operation of a modification of the FIG. 2 circuit.

FIG. 11 shows an example of the discharge state detection wherein different pulse voltages occur in the circuit of FIG. 10, and FIG. 12 shows details of the detecting circuit. Specifically, the manner of discharge state detection to be described here is applied to the detection in connection with a pulse peak voltage waveform J of a height $J_T$ (for example, 100 V) and a pulse peak voltage waveform L of the height $J_T$ superimposed with a higher out-of-phase height $J_B$ (for example, 300 V), as shown in FIG. 13. When the pulse waveform J or L from the pulse source 1 is applied across the electrodes, a normal discharge waveform K or M appears across the electrodes. At a time at which timing pulse $T_1$ or $T_1'$ occurs under the application of the pulse waveform J or L, the discharge waveform exceeds a detection level $E_3$ or $E_3'$ and it falls within a range between detection levels $E_1$ and $E_2$ during an interval $t_a$, making it possible to detect this discharge waveform as a normal discharge. Although not illustrated in FIG. 11, the abnormal arc discharge can be detected by using the fact that the voltage across the electrodes is below the detection level $E_3$ or $E'_3$, at the timing pulse $T_1$ or $T'_1$. With the different pulse peak voltages as exemplified above, switching between the detection levels $E_3$ and $E'_3$ and between the timing pulses $T_1$ and $T'_1$ is required. Such a switching operation is effected by a switching signal from the program controller. The discharge state detection as set forth above may be implemented by a discharge state detecting circuit as will be described with reference to FIG. 12. In FIGS. 10 and 12, like components are designated by like reference numerals. As shown in FIG. 12, divider resistors 911 and 912 are provided which divide the voltage across the electrodes into a voltage level which is low enough to avoid damage of IC or the like component circuit, and the low voltage level is fed to inputs of first, second and third comparators 913, 914 and 915. The first and second comparators 913 and 914 are also applied with the detection levels $E_1$ and $E_2$ as shown in FIG. 11, respectively. The third comparator 915 is also applied selectively with the detection level $E_3$ or $E_3'$ via a third set level selecting relay 923 which is responsive to a program signal C in accordance with the pulse peak value. With the application of outputs of the first and second comparators 913 and 914 to an AND gate 916, the detection of the time interval $t_a$ as shown in FIG. 11 over which the discharge proceeds is effected. When the pulse peak voltage takes the waveform J shown in FIG. 11, the relay 923 responsive to the signal C from the program controller acts to transmit the detection level $E_3$ to the third comparator 915 and a timing pulse selecting relay 924 also responsive to the signal C selects the timing pulse $T_1$. Accordingly, under the normal discharge state, the third comparator 915 produces an output signal applied, along with the timing pulse $T_1$, to an AND gate 917 which in turn produces an output signal for setting a flip-flop 918. The flip-flop 918 has a reset input terminal connected to receive a timing pulse $T_2$ produced from a timing pulse generator 921 on the basis of a pulse waveform of a pulse source. A delay circuit 922 for delaying a timing pulse $T_1'$ by a predetermined time is provided to obtain a timing pulse $T_1$. When the output of the AND gate 916, output Q of the flip-flop 918 and a signal having the same pulse width as that of the pulse waveform J are applied to an AND gate 919, the AND gate 919 delivers out a waveform O as shown in FIG. 11 for determining the time interval $t_a$ over which the discharge is effected. Under the abnormal arc discharge state, since the third comparator 915 will not produce the output and the flip-flop 918 will not be set, the inverting output, $\bar{Q}$, of the flip-flop 918 bears a logic "1" level and as a result, the abnormal arc discharge detection signal (not shown) is produced from an AND gate 920. Continuous generation of this abnormal arc discharge will damage the machining surface, resulting in defective machining. With the pulse peak voltage of the waveform L as shown in FIG. 11, the signal C from the program controller 901 causes the third set level selecting relay 923 to switch the detection level to $E_3'$ and it also causes the timing pulse selecting relay 924 to switch the timing pulse to $T_1'$.

Figure 14:
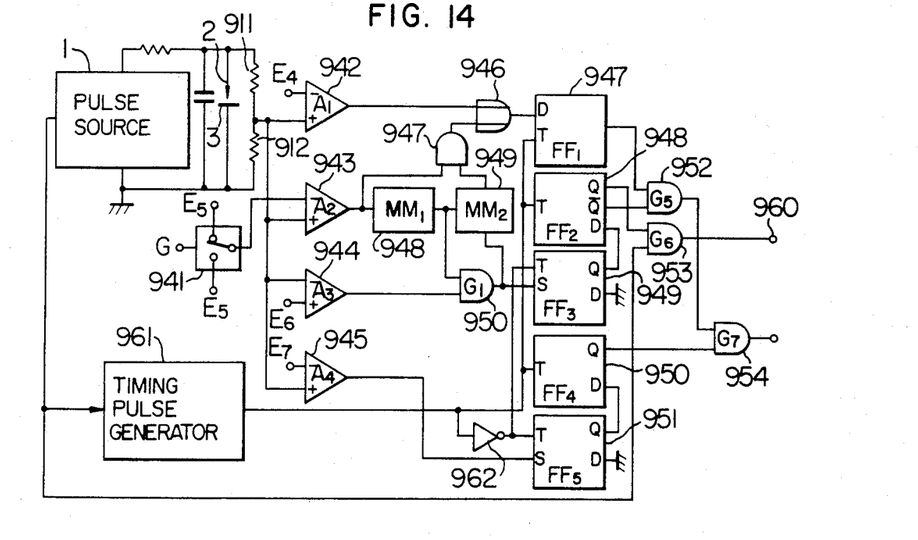
FIG. 14 is a circuit diagram of the modified circuit.

Next, an example of detection under the other pulse condition will be described specifically. A detecting circuit as shown in FIG. 14 is adapted to perform finishing machining with a small pulse current. In FIGS. 10, 12 and 14, like reference numerals designate like elements. A pulse generated from a pulse source 1 passes through a limiting resistor and charges a capacitor connected across the electrodes so that the discharge is effected through a predetermined electrode gap for machining.

The voltage across the electrodes is divided by voltage dividers 911 and 912 into a predetermined level and applied to one input of each fourth, fifth, sixth and seventh comparators 942 to 945. The other input of the respective comparators is fed with a detection level in such a manner that a level $E_4$ is coupled to the fourth comparator 942, either a level $E_5$ or $E_5'$ selected by a fifth set level selecting relay 941 responsive to a machining material selecting signal G from a program controller 901 is coupled to the fifth comparator 943, a level $E_6$ is coupled to the sixth comparator 944 and a level $E_7$ is coupled to the seventh comparator 945. When the discharge is effected with the voltage across the electrodes as shown in FIG. 13, the comparators produce output waveforms $A_1$, $A_2$ and $A_3$, respectively. In the voltage across the electrodes, discharges occur at discharge voltages $V_1$, $V_2$, $V_3$ and $V_4$ and especially, the discharge occurring at the discharge voltage $A_4$ is abnormal in which the voltage across the electrodes decreases before it reaches a predetermined voltage. At a peak $PT_6$ on a timing pulse $T_1$, the short-circuiting state occurs as will be seen from the voltage across the electrodes. The voltage across the electrodes also contains the non-discharge state but the detection of the normal discharge will be described hereunder. The condition of the normal discharge is such that voltage stored in the capacitor exceeds the detection level $E_5$ (or $E_5'$ dependent on the material) and the voltage decreases rapidly with the discharge. The output of the fourth comparator 942 is applied to one input of an OR gate 946, and the output of the fifth comparator 943 is applied to a one shot multivibrator 948 and one input of an AND gate 947. When the voltage across the electrodes falls below the detection level $E_5$ (or $E_5'$) of the fifth comparator 943 and the discharge takes place through the electrode gap with attendant rapid voltage decrease at the discharge voltages $V_1$, $V_2$, . . ., the one shot multivibrator 948 generates a check pulse having a width $t_1$ as shown at a waveform $MM_1$. With the voltage across the electrodes decreasing below the detection level $E_6$ of the sixth comparator 944 within the width $t_1$, an AND gate 950 produces an output waveform $G_1$. A D-type flip-flop 953 is then set by the output signal $G_1$ and thereafter reset by a signal originating from inversion of the timing pulse $T_1$ from a timing pulse generator 961 by an inverter 962, thereby producing an output waveform $FF_3Q$. The output signal of the flip-flop 953 is in turn applied to a D input terminal of another D-type flip-flop 952, which produces an output waveform $FF_2Q$ in synchronism with the timing pulse $T_1$. Thus, the discharge voltages $V_1$, $V_2$ and $V_3$ representative of the normal discharge are detected at a delay of one cycle period in synchronism with the timing pulse $T_1$. For example, the output signal $FF_2Q$ representative of the detection of the normal discharge occurring between peaks $PT_1$ and $PT_2$ on the timing pulse $T_1$ is obtained between peaks $PT_2$ and $PT_3$. Such a detection signal and a waveform equivalent to the pulse source signal are ANDed by an AND gate 957 to produce a waveform $G_2$ which is corrected by the duty factor of the machining pulse and corresponds to the machining speed.

Similarly, a signal representative of the abnormal arc discharge is treated through the logical circuit and produced from an AND gate 958. In the above detection, the signal G from the program controller 901 actuates the relay 941 to select the detection level $E_5$ of the fifth comparator for a workpiece of iron or the detection level $E_5'$ for a workpiece of super hand alloy. For a workpiece of a normal configuration, it is recommended to set the level $E_5$ to about 150 V and the level $E_5'$ to 60 V. With these experimentally determined values, it was affirmed that the detected normal discharge is related to the machining speed in one-to-one correspondence.

Figure 15:
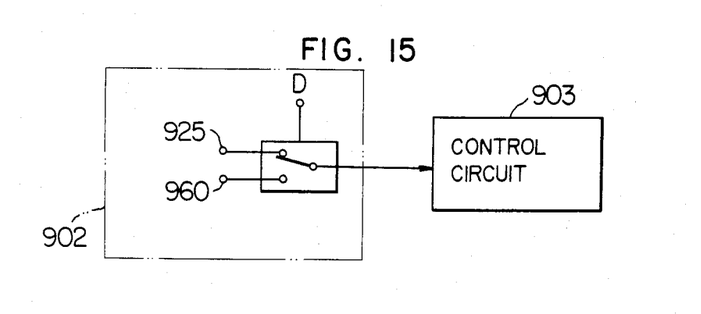
FIGS. 15 and 16 are block diagrams illustrative of part of the FIG. 10 embodiment.

FIG. 15 shows a modified embodiment wherein a relay 970 is actuated by the detection signals from the normal pulse source as shown in FIG. 12 and the capacitor type pulse source as shown in FIG. 14 and a D signal indicative of the use or non-use of the capacitor type pulse source to selectively transmit therethrough the detection signal from the normal discharge detection signal output terminal 925 to an optimization controller 903. Although not shown, the detection signal for the abnormal arc discharge, short-circuiting or non-discharge may be subjected to a similar selecting operation.

Figure 16:
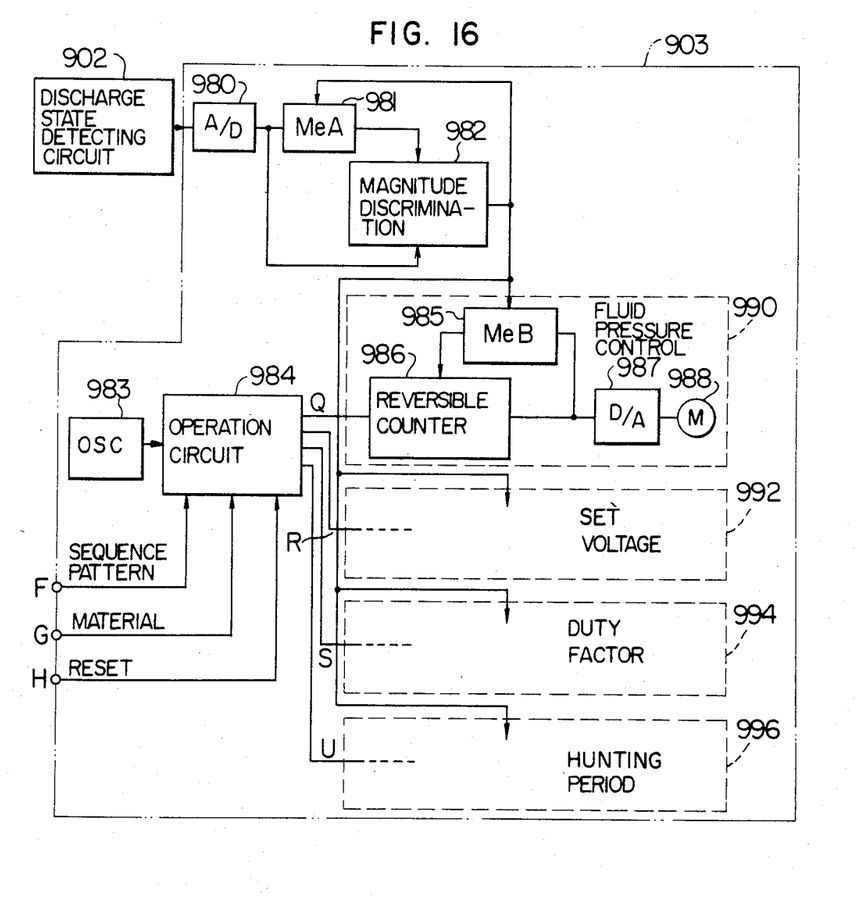

Specifically, the optimization controller 903 comprises as shown in FIG. 16 an A/D converter 980 which converts an analog signal representative of an averaged DC voltage of the normal discharge detected by the discharge state detecting circuit into a digital signal, a memory 981 for storage of the digital signal, and a magnitude discriminator 982 connected to receive the digital signal. On the other hand, an operation pulse from an operation pulse generator 983 drives an operation circuit 984 which receives the signals F, G and H from the program controller 901 to produce operation pulses Q at a predetermined period. A working fluid pressure control circuit 990 comprises a reversible counter 986 which sequentially adds or subtract the operation pulses Q from the operation circuit 984 within a predetermined range and produces an output signal to be converted into an analog signal by a D/A converter 987, and a motor 988 driven with this analog signal to rotate a working fluid pressure control valve (not shown) for generation of a desired pressure. During the working fluid pressure controlling operation, the magnitude discriminator 982 determines when the discharge voltage representative of the normal discharge is the maximum and this discrimination signal is applied to a memory B 985 so that the memory B 985 stores a working fluid pressure optimized for the maximum discharge voltage representative of the normal discharge during the working fluid pressure controlling operation, and at the completion of the working fluid pressure controlling operation, the optimized working fluid pressure is again set into the reversible counter 986 and spark machining is then effected. In addition to the working fluid pressure control circuit 990, machining voltage control circuit 992, duty factor control 994 and electrode raising period control circuit 996 are similarly operated by sequentially receiving operation output signals R, S and U in accordance with the control signals F, G and H of the program controller which have been programmed in advance.

Figure 17:
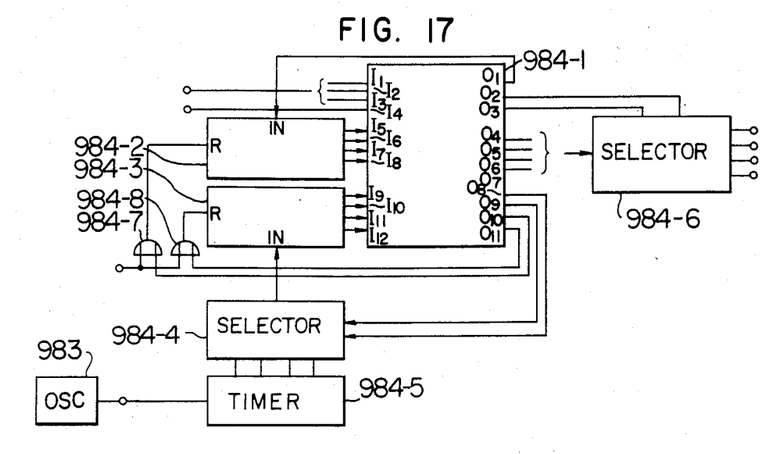
FIG. 17 is a circuit diagram illustrative of part of the FIG. 16 block diagram.

FIG. 17 shows details of the operation circuit 984. In FIG. 17, a memory 984-1 of an LSI has input terminals $I_1$ to $I_{12}$ for address designation and 12-bit output terminals $O_1$ to $O_{11}$. Applied to the input terminals $I_1$, $I_2$ and $I_3$ is the signal F from the program controller 901, and applied to the input terminal $I_4$ is the signal G. Connected to the input terminals $I_5$, $I_6$, $I_7$ and $I_8$ is a program counter A which serves to switch the sequence of the working fluid pressure P, machining voltage U, duty factor $\tau$ and electrode raising period T, and connected to the input terminals $I_9$, $I_{10}$, $I_{11}$ and $I_{12}$ is a program counter B which serves to execute a program for initiation, range and step width of the operation under the above condition.

In operation, the signal F indicative of sequence pattern selection and the signal G indicative of material selection are first applied to the input terminals $I_1$ to $I_4$. For example, as shown in FIG. 18, the condition is such that the electrode material is copper, the workpiece material is iron and the sequence pattern is I. On the other hand, the program controller 901 applies the reset signal H to the program counters A and B via OR gates 984-7 and 984-8, and these program counters are brought into operation. A pulse signal at a predetermined period generated from the oscillator 983 is applied to a timer 984-5 which in turn produces from its output terminals clock signals at different periods. The clock signals are applied to a selector 984-4 responsive to search speed selection signals from the output terminals $O_8$ and $O_9$ of the memory 984-1 to thereby produce a search signal applied to the program counter B. The search signal is counted by the program counter B. Under the sequence pattern I as selected above, the search signal is so stored as to select the working fluid pressure. Accordingly, a selector 984-6 responsive to the output signals from the output terminals $O_2$ and $O_3$ is switched to transmit therethrough signals from the output terminals $O_4$, $O_5$, $O_6$ and $O_7$ corresponding to the initial value of working fluid pressure to an output terminal for the operation output signal Q, and this operation output signal Q is fed to the working fluid pressure control circuit 990 shown in FIG. 16. The initial value of working fluid pressure has been adjusted beforehand to 0.05 Kg/cm² by the D/A converter 987 shown in FIG. 16. In response to the search signal generated from the selector 984-4 at the predetermined period and applied to the program counter B, the working fluid pressure is so controlled as to change stepwise by a step of about 0.1 Kg/cm² until the change amounts to 0.3 Kg/cm² in total. Subsequently, the output signal is produced from the output terminal $O_1$ of the memory 984-1 and applied to the program counter 984-2. The contents of the program counter A change by 1(one) bit, and address designation inputs responsive to this change and applied to the input terminals $I_5$, $I_6$, $I_7$ and $I_8$ of the memory 984-1 select the duty factor operation output signal $\tau$ in accordance with the predetermined sequence shown in FIG. 18. Concurrently therewith, a reset signal is produced from the output terminal $O_{11}$ and applied via the OR gate 984-8 to the counter 984-3 to thereby reset the same. In the example of FIG. 18, the initial value of duty factor $\tau_1$ is set to 10% and the maximum is set to 90%. In a similar manner, a sequential operation is carried out by a predetermined search signal. Subsequently, the operation of the machining voltage U, the second duty factor $\tau_2$, and the second machining voltage $U_2$, is carried out within a predetermined range. Where the supply of fluid stream is effected through, for example, nozzle jet stream process as mentioned in remarks of FIG. 18 to meet the configuration of the workpiece, the data to be stored in the memory is adapted for determining that the search signal is produced from the selector A at a period of 2 seconds. Further, for repeating the above operation, the data to be stored in the memory is such that the program counters A and B are sequentially reset by output signals from the output terminals $O_{10}$ and $O_{11}$ of the memory.

In this manner, the machining condition is determined within the predetermined range by selecting the operation sequence pattern and the material signals from the program controller 901, and the optimized machining condition can be obtained automatically by the optimization controller as shown in FIG. 16. The identity of the electrode material, workpiece material, and working fluid supplying method are inputted to the program controller 901 by the operator utilitzing a suitable input unit. A suitable one of the sequence patterns I to V of FIG. 18 is automatically selected by the program controller in accordance with the above-identified information which has been inputted to the program controller.

As described above, in the spark machining apparatus according to the present invention, the program controller is programmed with the pulse condition in accordance with the machining depth and the like factor meeting desired machining configuration and size, the optimization controller automatically optimizes the machining stabilizing condition other than the pulse condition, and the coupling circuit is responsive to the pulse condition switching signal produced from the program controller to operate the optimization controller, whereby efficiency of spark machining can be improved and the machining stabilizing condition can be set without resort to skill.

The automatic condition setting by the program controller and the optimization controller to produce stable machining ensures economic full-automated operation at night.

Figure 19:
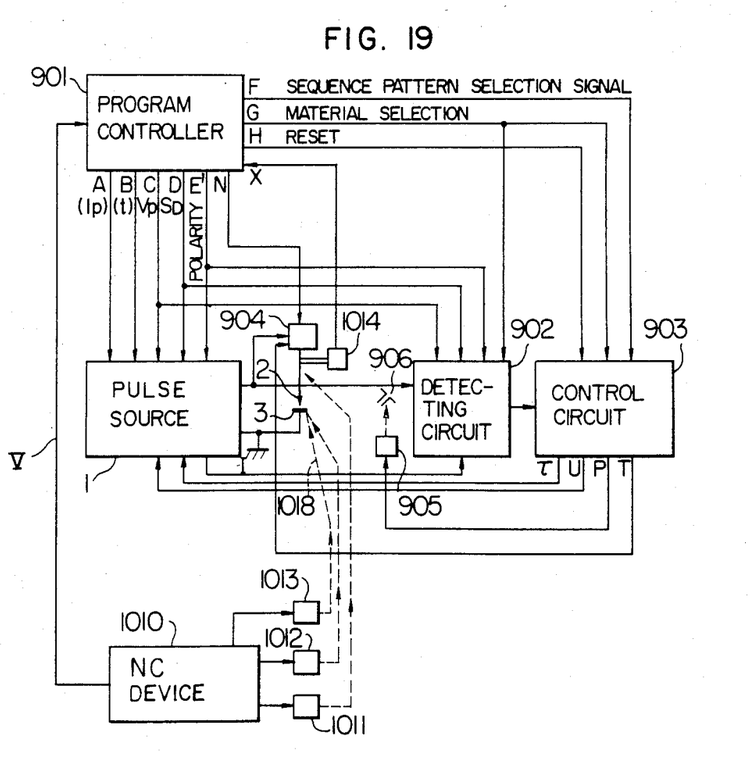
FIG. 19 is a block diagram of still another embodiment of the invention.

FIG. 19 shows, in block form, a modification of the FIG. 10 embodiment with like elements in these figures designated by like reference numerals. This modification comprises a working fluid pressure drive circuit 1018, an NC device 1010, an electrode exchange unit 1011, a table X-axis drive circuit 1012, a table Y-axis drive circuit 1013, and an electrode feed detecting and processing unit 1014.

In operation, when starting machining, an electrode designated by a program in the NC device 1010 is set to the electrode feed unit by means of the electrode exchange unit 1011, and the table X-axis drive circuit 1012 and table Y-axis drive circuit 1013 set a workpiece to a position designated by the program. A first machining condition command signal V corresponding to the designated electrode is fed to the program controller 901. Pulse condition setting signals A, B, C, D and E programmed in the program controller 901 by the command signal V are fed to the pulse source as in the previous embodiment of FIG. 10. The program controller 901 also applies to the electrode feed drive circuit 904 a command signal N for selecting the gain of the electrode feed servo system and the electrode raising motion. In addition to the command signal V from the NC device 1010, an output signal X from the electrode feed detecting and processing unit 1014 also serves for selection of a plurality of sets of condition programmed in the program controller 901. The electrode feed detecting and processing unit 1014 produces the output signal when the feed of the electrode reaches a predetermined value. A plurality of values of electrode feed may be set by the circuit 1014.

The detection of the discharge state by the discharge state detecting circuit 902 and the controlling operation based on the detection signal by the machining stabilizing control circuit 903 are performed in the same manner as the FIG. 10 embodiment and will not be described herein for avoiding prolixity of description.

Thus, details of operation and advantages of the FIG. 19 will obviously be understood from the description of the previous embodiments explained with reference to FIGS. 11 to 18.

In an alternative, the electrode feed may be driven by the NC device 1010 in place of the circuit 904 by applying a selection signal generated from the NC device 1010 to the program controller 901 in place of the signal X generated from the electrode feed detecting and processing unit 1014. In such an alternative, the output signal N of the program controller 901 may be coupled to the NC device 1010. Further, where the table X-axis drive circuit 1012 and the table Y-axis drive circuit 1013 are driven by the NC device 1010 and the electrode and workpiece are moved relative to each other to change the gap between the electrode and the machining surface continuously and periodically, the program controller 901 may generate an additional command signal for this purpose to be applied to the NC device 1010.

What is claimed is:

1. An electric discharge machining apparatus in which discharge pulses are generated between an electrode and a workpiece for spark machining of the workpiece, said apparatus comprising:
    power source means for applying a pulse voltage across the electrode and the workpiece to produce discharge pulses;
    discharge state detecting means coupled to said power source means for generating detection outputs representative of discharge states between said electrode and workpiece;
    search means for changing a plurality of machining stabilizing conditions in a predetermined order and within a predetermined range of values of each of said machining stabilizing conditions to produce variation in the rate of generation of discharge pulses, and providing a search sequence pattern of said machining stabilizing conditions selected from one of a plurality of search sequence patterns in accordance with a choice of electrode material, workpiece material, and a working fluid supplying method;
    maximum value discriminating and storing means coupled to said discharge state detecting means for discriminating a maximum value of the effective discharge generation rate throughout said change of said at least one machining stabilizing condition and storing therein the maximum value; and
    optimizing machining condition storing means coupled to said maximum value discriminating and storing means for storing therein an optimized machining condition corresponding to the maximum value of the effective discharge generation rate for each machining stabilizing condition;
    whereby spark machining is effected on the basis of the optimized machining condition.

2. An electric discharge machining apparatus according to claim 1, wherein said discharge state discriminating circuit detects effective discharge state, abnormal arc discharge state, short-circuiting state and non-discharge state in the spark machining.

3. An electric discharge machining apparatus according to claim 1, further comprising an abnormal arc discharge detecting circuit for raising said electrode or suspending the generation of said pulse voltage when the abnormal arc discharge continues for a predetermined time.

4. An electric discharge machining apparatus according to claim 1, wherein said effective discharge generation rate detecting circuit comprises a correction circuit for taking an abnormal arc discharge which disappears within the predetermined time for an effective discharge and adding the generation of the abnormal arc discharge taken for the effective discharge to the effective discharge generation rate.

5. An electric discharge machining apparatus according to claim 1, wherein said machining stabilizing conditions are machining set voltage, duty factor of the discharge pulse, electrode raising period and working fluid pressure.

6. An electric discharge machining apparatus according to claim 5, wherein said search circuit changes each of the machining set voltage, discharge pulse duty factor, electrode raising period and working fluid pressure within a predetermined range for optimization of the machining condition.

7. An electric discharge machining apparatus in which discharge pulses are generated between an electrode and a workpiece for spark machining of the workpiece, said apparatus comprising;
    power source means for applying pulse voltages across the electrode and the workpiece to produce discharge pulses;
    program control means programmed with a plurality of discharge pulse designation signals for designating the pulse voltage of said power source means and control signals for setting an optimized machining stabilizing condition;
    discharge state detecting means coupled to said power source means for generating detection outputs representative of discharge states between said electrode and workpiece; and
    machining stabilizing control means coupled to said discharge state detecting circuit and said program control means for changing at least one machining stabilizing condition in a predetermined order and within a predetermined range of values for setting optimized machining stabilizing conditions and providing a control sequence pattern of said at least one machining stabilizing condition selected from one of a plurality of control sequence patterns stored in said program control means in accordance with a choice of electrode material, a workpiece material, and a working fluid supplying method;
    whereby spark machining is effected on the basis of the optimized machining stabilizing condition.

8. An electric discharge machining apparatus according to claim 7, wherein said discharge state detecting circuit comprises means responsive to at least one of the discharge pulses designating signal and the control signal to select detection sensitivity of said detecting circuit.

9. An electric discharge machining apparatus according to claim 7, wherein said machining stabilizing control circuit changes each of the working fluid pressure, machining voltage, duty factor of the discharge pulse and electrode raising period within a predetermined range for setting the optimized machining stabilizing condition.

10. An electric discharge machining apparatus according to claim 7, wherein said discharge pulse designating signals comprise a pulse current designating signal, a pulse width designating signal, a pulse polarity designating signal and a pulse type designating signal.

11. An electric discharge machining apparatus according to claim 7, wherein said control signals comprise a workpiece material designating signal, an optimized machining stabilizing condition setting operation pattern selection signal and a reset signal.

12. An electric discharge machining apparatus according to claim 7, further comprising a numerical control device for determining the spark machining condition between said electrode and workpiece.

13. An electric discharge machining apparatus in which discharge pulses are generated between an electrode and a workpiece for spark machining of the workpiece, said apparatus comprising:

power source means for applying pulse voltages across the electrode and the workpiece to produce discharge pulses;

program control means programmed with a plurality of discharge pulse designation signals for designating the pulse voltage of said power source means and control signals for setting an optimized machining stabilizing condition;

discharge state detecting means coupled to said power source means for generating detection outputs representative of discharge states between said electrode and workpiece;

machining stabilizing control means coupled to said discharge state detecting circuit and program control means for changing at least one machining stabilizing condition in a predetermined order and within a predetermined range of values for setting optimized machining stabilizing conditions, discriminating a maximum value of effective discharge generation rate throughout said change of said at least one machining stabilizing condition and storing the maximum value, storing an optimized machining condition corresponding to the maximum value of the effective discharge generation rate, and providing a control sequence pattern of said at least one machining stabilizing condition selected from one of a plurality of control sequence patterns stored in said program control means in accordance with a choice of electrode material, a workpiece material, and a working fluid supplying method; and whereby spark machining is effected on the basis of the optimized machining stabilizing condition.

14. An electric discharge machining apparatus according to claim 13, wherein said discharge state detecting circuit comprises means responsive to at least one of the discharge pulse designating signal and the control signal to select detection sensitivity of said detecting circuit.

15. An electric discharge machining apparatus according to claim 13, wherein said machining stabilizing control circuit changes each of the working fluid pressure, machining voltage, duty factor of the discharge pulse and electrode raising period within a predetermined range for setting the optimized machining stabilizing condition.

16. An electric discharge machining apparatus according to claim 13, wherein said discharge pulse designating signals comprise a pulse current designating signal, a pulse width designating signal, a pulse polarity designating signal and a pulse type designating signal.

17. An electric discharge machining apparatus according to claim 13, wherein said control signals comprise a workpiece material designating signal, an optimized machining stabilizing condition setting operation pattern selection signal and a reset signal.

18. An electric discharge machining apparatus according to claim 13, further comprising a numerical control device for determining the spark machining condition between said electrode and workpiece.

* * * * *